(12) United States Patent
Uhm et al.

(10) Patent No.: US 12,230,782 B2
(45) Date of Patent: Feb. 18, 2025

(54) LITHIUM SECONDARY BATTERY

(71) Applicant: LG ENERGY SOLUTION, LTD., Seoul (KR)

(72) Inventors: Insung Uhm, Daejeon (KR); Sin Young Park, Daejeon (KR); Taegon Kim, Daejeon (KR); Minchul Jang, Daejeon (KR); Wang Mo Jung, Daejeon (KR); Boram Lee, Daejeon (KR); Byoungkuk Son, Daejeon (KR); Eunkyung Park, Daejeon (KR); Seongmin Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 635 days.

(21) Appl. No.: 17/290,130

(22) PCT Filed: Nov. 1, 2019

(86) PCT No.: PCT/KR2019/014731
§ 371 (c)(1),
(2) Date: Apr. 29, 2021

(87) PCT Pub. No.: WO2020/091515
PCT Pub. Date: May 7, 2020

(65) Prior Publication Data
US 2021/0399276 A1    Dec. 23, 2021

(30) Foreign Application Priority Data

Nov. 2, 2018 (KR) .................. 10-2018-0133289
Nov. 1, 2019 (KR) .................. 10-2019-0138598

(51) Int. Cl.
*H01M 4/131* (2010.01)
*H01M 4/02* (2006.01)
(Continued)

(52) U.S. Cl.
CPC ........... *H01M 4/131* (2013.01); *H01M 4/505* (2013.01); *H01M 4/525* (2013.01); *H01M 4/621* (2013.01);
(Continued)

(58) Field of Classification Search
CPC ...... H01M 4/131; H01M 4/505; H01M 4/525; H01M 4/621; H01M 4/661; H01M 4/667;
(Continued)

(56) References Cited

U.S. PATENT DOCUMENTS 6,255,020 B1    7/2001 Yamashita et al.
6,365,300 B1    4/2002 Ota et al.
(Continued)

FOREIGN PATENT DOCUMENTS

CN    101164186 A    4/2008
CN    106415893 A    2/2017
(Continued)

OTHER PUBLICATIONS

International Search Report (with partial translation) and Written Opinion dated Feb. 11, 2020, issued in corresponding International Patent Application No. PCT/KR2019/014731.
(Continued)

*Primary Examiner* — Christian Roldan
*Assistant Examiner* — Robert Gene West
(74) *Attorney, Agent, or Firm* — MORGAN, LEWIS & BOCKIUS LLP (57) ABSTRACT

The present invention relates to a lithium secondary battery manufactured by forming a negative electrode free battery and then forming a lithium metal on the negative electrode current collector by charging.
In the lithium secondary battery, since lithium metal is formed on the negative electrode current collector in the state of being blocked with the atmosphere, the generation
(Continued)

of the conventional surface oxide layer (native layer) formed on the negative electrode does not occur inherently, thereby preventing the reduction of the efficiency and lifetime characteristics of the battery.

20 Claims, 3 Drawing Sheets (51) Int. Cl.
*H01M 4/505* (2010.01)
*H01M 4/525* (2010.01)
*H01M 4/62* (2006.01)
*H01M 4/66* (2006.01)
*H01M 10/0525* (2010.01)
*H01M 10/44* (2006.01)

(52) U.S. Cl.
CPC .......... *H01M 4/661* (2013.01); *H01M 4/667* (2013.01); *H01M 10/0525* (2013.01); *H01M 10/446* (2013.01); *H01M 2004/021* (2013.01)

(58) Field of Classification Search
CPC .......... H01M 10/0525; H01M 10/446; H01M 2004/021
USPC ....................................................... 429/209
See application file for complete search history.

(56) References Cited

U.S. PATENT DOCUMENTS

| | | | |
|---|---|---|---|
| 10,116,000 B1 * | 10/2018 | Federici | H01M 4/139 |
| 2002/0018935 A1 | 2/2002 | Okada | |
| 2004/0157124 A1 | 8/2004 | Goh et al. | |
| 2006/0257737 A1 | 11/2006 | Goh et al. | |
| 2013/0171524 A1 | 7/2013 | Cho et al. | |
| 2013/0188294 A1 | 7/2013 | Kim et al. | |
| 2014/0178777 A1 * | 6/2014 | Lee | H01M 4/366 |
| | | | 429/405 |
| 2016/0036091 A1 | 2/2016 | Ohtomo et al. | |
| 2017/0104209 A1 | 4/2017 | Son et al. | |
| 2017/0133660 A1 | 5/2017 | Kurihara et al. | |
| 2018/0197691 A1 | 7/2018 | Song et al. | |
| 2018/0219250 A1 | 8/2018 | Delobel et al. | |
| 2018/0309169 A1 * | 10/2018 | Yang | H01M 10/0525 |
| 2018/0316064 A1 * | 11/2018 | Wei | H01M 10/28 |
| 2018/0323430 A1 | 11/2018 | Son et al. | |
| 2018/0323467 A1 | 11/2018 | Tang et al. | |
| 2019/0013521 A1 | 1/2019 | Yamada et al. | |
| 2019/0067702 A1 | 2/2019 | Son et al. | |

FOREIGN PATENT DOCUMENTS

| | | | | |
|---|---|---|---|---|
| CN | 108028357 A | | 5/2018 | |
| CN | 108028429 A | | 5/2018 | |
| CN | 108701815 A | * | 10/2018 | .......... H01M 10/052 |
| EP | 1880436 | | 1/2008 | |
| EP | 2833465 A1 | * | 2/2015 | ........ H01M 10/0525 |
| EP | 3346540 A1 | * | 7/2018 | .......... H01M 10/052 |
| EP | 3396736 A1 | * | 10/2018 | .......... H01M 10/052 |
| JP | 2002-237293 A | | 8/2002 | |
| JP | 3578015 B2 | | 10/2004 | |
| JP | 2010-231950 A | | 10/2010 | |
| JP | 2015-069809 A | | 4/2015 | |
| JP | 2016-035867 A | | 3/2016 | |
| KR | 10-0285123 B1 | | 3/2001 | |
| KR | 10-0484713 B1 | | 4/2005 | |
| KR | 10-2006-0111393 | | 10/2006 | |
| KR | 10-2012-0035131 A | | 4/2012 | |
| KR | 10-2012-0122789 A | | 11/2012 | |
| KR | 10-2013-0079109 A | | 7/2013 | |
| KR | 10-2013-0112567 A | | 10/2013 | |
| KR | 10-2013-0134949 A | | 12/2013 | |
| KR | 10-1383360 B1 | | 4/2014 | |
| KR | 10-1527997 B1 | | 6/2015 | |
| KR | 10-1551521 B1 | | 9/2015 | |
| KR | 101560827 B1 | * | 10/2015 | |
| KR | 10-2016-0052323 A | | 5/2016 | |
| KR | 10-2016-0138120 A | | 12/2016 | |
| KR | 10-2017-0003209 A | | 1/2017 | |
| KR | 10-2017-0061866 A | | 6/2017 | |
| KR | 10-2018-0007798 A | | 1/2018 | |
| KR | 10-2018-0010423 A | | 1/2018 | |
| KR | 10-2018-0043183 A | | 4/2018 | |
| KR | 10-2018-0067586 A | | 6/2018 | |
| WO | 2006/112674 A1 | | 10/2006 | |
| WO | WO-2018008953 A1 | * | 1/2018 | ........ H01M 10/0525 |
| WO | WO-2018198940 A1 | * | 11/2018 | .......... H01M 10/052 |
| WO | WO-2018200631 A1 | * | 11/2018 | ........ H01M 10/0525 |

OTHER PUBLICATIONS

Extended European Search Report dated Nov. 8, 2021 issued by the European Patent Office in corresponding European Patent Application No. 19877971.2.

Park et al., "Li2NiO2 as a sacrificing positive additive for lithium-ion batteries," Electrochimica Acta, vol. 108, (2013), pp. 591-595, XP028757637.

Office Action issued in related Chinese Patent Application No. 201980070481.4 dated Jun. 1, 2023.

Office Action dated Mar. 30, 2024 issued in Chinese Patent Application No. 201980070481.4.

* cited by examiner

LITHIUM SECONDARY BATTERY

TECHNICAL FIELD

This application claims the benefits of priorities based on Korean Patent Application No. 10-2018-0133289 filed on Nov. 2, 2018 and Korean Patent Application No. 10-2019-0138598 filed on Nov. 1, 2019, the entire contents of which are incorporated herein by reference.

The present invention relates to a lithium secondary battery having a negative electrode free (anode free) structure to which a high-irreversible positive electrode material is applied.

BACKGROUND ART

Recently, various devices that require batteries, such as cellular phones, wireless home appliances, and electric vehicles, are being developed. As these devices are developed, the demand for secondary batteries is also increasing. Particularly, along with the tendency of miniaturization of electronic products, secondary batteries are also becoming lighter and smaller.

In accordance with this trend, lithium secondary batteries, which use lithium metal as active material, are attracting attention. Lithium metal has a low redox potential (−3.045 V vs. standard hydrogen electrode) and a high weight energy density (3,860 mAhg$^{-1}$), and thus is expected to be a negative electrode material for high capacity secondary batteries.

However, when lithium metal is used as a negative electrode of a battery, the battery is generally prepared by attaching a lithium foil on a planar current collector. In this case, since lithium is highly reactive as an alkali metal and reacts explosively with water and also with oxygen in the air, lithium has the disadvantage of being difficult to prepare and use in a general environment. In particular, when lithium metal is exposed to the atmosphere, it has an oxide layer of LiOH, Li$_2$O, Li$_2$CO$_3$ or the like as a result of oxidation. If the surface oxide layer (native layer) is present on the surface, there is a problem that the oxide layer acts as an insulating film to lower the electrical conductivity and inhibit the smooth movement of lithium ions, thereby causing an increase in electrical resistance.

For this reason, the vacuum deposition process was performed to form the lithium negative electrode, and thus the problem of the formation of the surface oxide layer due to the reactivity of lithium metal was partially improved. However, lithium metal is still exposed to the atmosphere during the battery assembly process, the original suppression of the formation of the surface oxide layer is impossible. Therefore, it is required to develop a lithium metal electrode that can solve the problem of the reactivity of lithium and can further simplify the process, while improving the energy efficiency using lithium metal.

(Patent document 1) Korean Laid-open Patent Publication No. 10-2016-0052323 "Lithium electrode and lithium battery comprising same"

DISCLOSURE

Technical Problem

As a result of various studies to solve the above problems, the inventors of the present invention have designed a negative electrode free battery structure, which can form a lithium metal layer on the negative electrode current collector by lithium ions transferred from the positive electrode active material by the charging after the assembly of the battery, in order to fundamentally block the contact of lithium metal with the atmosphere during the assembly of the battery, and have developed a composition of a positive electrode active material capable of stably forming the lithium metal layer.

Therefore, it is an object of the present invention to provide a lithium secondary battery having improved performance and lifetime by solving the problems caused by reactivity of lithium metal and the problems occurring during the assembly process.

Technical Solution

In order to achieve the above object, the present invention provides a lithium secondary battery comprising a positive electrode, a negative electrode, a separator interposed therebetween, and an electrolyte, wherein a positive electrode active material and a lithium metal compound having an irreversible capacity of 200 mAh/g or more and an initial irreversibility of 25% or more is contained in the positive electrode mixture of the positive electrode, and during charging of the lithium secondary battery, lithium metal of the positive electrode moves from the positive electrode and is formed on the negative electrode current collector.

Advantageous Effects

In the lithium secondary battery according to the present invention, since the lithium metal layer is coated in a blocked state from the air throughout the process of forming a lithium metal layer on the negative electrode current collector, it is possible to suppress the formation of surface oxide layer of lithium metal due to oxygen and moisture in the atmosphere, and as a result, there is an effect of improving cycle lifetime characteristics.

BEST MODE

Hereinafter, the present invention will be described in detail with reference to the accompanying drawings so that those skilled in the art may easily implement the present invention. However, the present invention may be embodied in many different forms and should not be construed as limited to the present specification.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

Figure 1:
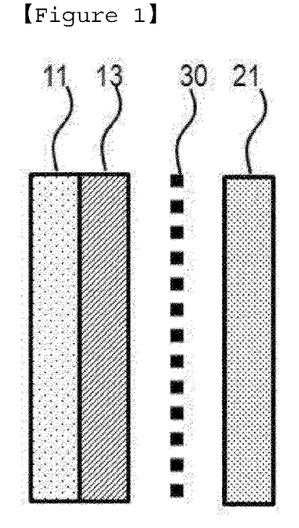
FIG. 1 is a schematic diagram of the lithium secondary battery manufactured according to the first embodiment of the present invention.

FIG. 1 is a cross-sectional view of the lithium secondary battery manufactured according to the first embodiment of the present invention, which has a positive electrode comprising the positive electrode current collector 11 and the positive electrode mixture 13; a negative electrode comprising the negative electrode current collector 21; and a separator 30 interposed therebetween and an electrolyte (not shown).

The negative electrode of the lithium secondary battery is usually prepared by forming a negative electrode on the negative electrode current collector 21. However, in the present invention, after assembling the negative electrode free cell structure using only the negative electrode current collector 21, as lithium ions released from the positive electrode mixture 13 by charging form lithium metal (not shown) as a negative electrode mixture on the negative electrode current collector 21, a negative electrode having a configuration of a known negative electrode current collector/negative electrode mixture is formed to form a conventional lithium secondary battery.

That is, in the present invention, the negative electrode free battery may be a negative electrode free battery in which a negative electrode is not formed on the negative electrode current collector at the time of initial assembly, and may be a concept all including a battery in which a negative electrode may exist by forming a negative electrode on the negative electrode current collector according to use.

In addition, in the negative electrode of the present invention, the form of the lithium metal formed as a negative electrode mixture on the negative electrode current collector comprises both a form in which a lithium metal is formed as a layer and a structure in which the lithium metal is not formed as a layer (for example, a structure in which lithium metal is aggregated in the form of particles).

Hereinafter, the present invention will be described based on the form of the lithium metal layer 23 formed from lithium metal as a layer, but it is clear that this explanation does not exclude the structure in which lithium metal is not formed as the layer.

Figure 2:
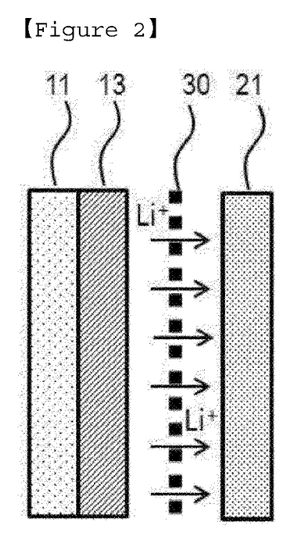
FIG. 2 is a schematic diagram showing the movement of lithium ion (Li$^+$) during the initial charging of the lithium secondary battery manufactured according to the first embodiment of the present invention.
Figure 3:
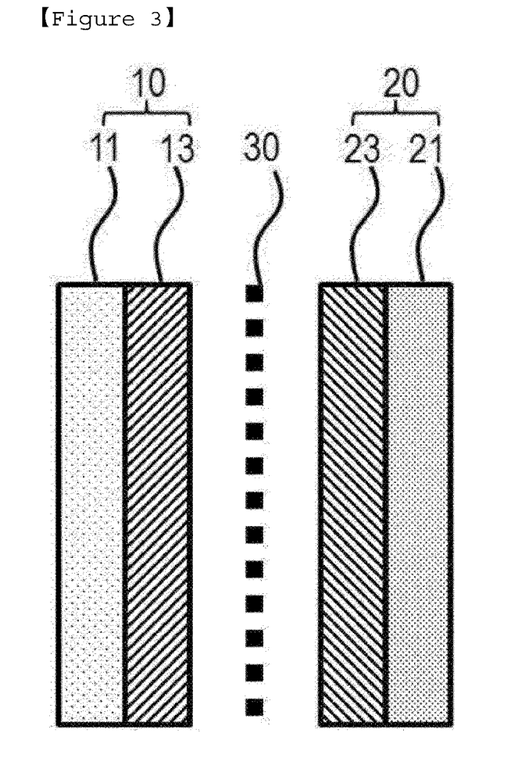
FIG. 3 is a schematic diagram after completion of the initial charging of the lithium secondary battery manufactured according to the first embodiment of the present invention.

FIG. 2 is a schematic diagram showing the movement of lithium ion (Li$^+$) during the initial charging of the lithium secondary battery manufactured according to the first embodiment of the present invention, and FIG. 3 is a schematic diagram after completion of the initial charging of the lithium secondary battery manufactured according to the first embodiment of the present invention.

Referring to FIGS. 2 and 3, when performing the charging by applying a voltage above a predetermined level to a lithium secondary battery having a negative electrode free battery structure, lithium ions are desorbed from the positive electrode mixture 13 in the positive electrode 10, pass through the separator 30, move to the negative electrode current collector 21, and form a lithium metal layer 23 consisting purely of lithium on the negative electrode current collector 21 to form a negative electrode 20.

The formation of the lithium metal layer 23 through the changing has an advantage that a layer of thin film can be formed and it is very easy to control the interfacial properties as compared to the conventional negative electrode prepared by sputtering the lithium metal layer 23 on the negative electrode current collector 21 or laminating the lithium foil and the negative electrode current collector 21. In addition, since the bonding strength of the lithium metal layer 23 stacked on the negative electrode current collector 21 is large and stable, the problem of elimination from the negative electrode current collector 21 again by the ionization state through discharge does not occur.

In particular, by forming a negative electrode-free battery structure, lithium metal is not exposed to the air at all during the assembly of the battery. Accordingly, the conventional problems such as formation of oxide layer on the surface due to high reactivity of lithium itself, and consequently deterioration of lifetime of the lithium secondary battery can be essentially blocked.

The implementation of the lithium secondary battery having the negative electrode-free structure can be implemented in various ways, but in the present invention, is secured by controlling the composition used for the positive electrode mixture 13.

The positive electrode mixture 13 may be prepared using various positive electrode active materials depending on the type of battery, and the positive electrode active material used in the present invention is not particularly limited as long as the positive electrode active material is a material capable of intercalating and deintercalating lithium ions, but is currently a lithium transition metal oxide as a positive electrode active material capable of realizing a battery having excellent lifetime characteristics and charging/discharging efficiency.

As the lithium transition metal oxide, layered compounds such as lithium cobalt oxide ($LiCoO_2$) and lithium nickel oxide ($LiNiO_2$) containing two or more transition metals, for example, substituted with one or more transition metals; lithium manganese oxide substituted with one or more transition metals, lithium nickel-based oxide, spinel-based lithium nickel manganese complex oxide, spinel-based lithium manganese oxide in which a part of Li in the formula is substituted with alkaline earth metal ions, olivine-based lithium metal phosphate, and the like can be comprised, but is not limited thereto.

It is preferable to use a lithium-containing transition metal oxide. The lithium-containing transition metal oxide may be, for example, at least one selected from the group consisting of $LiCoO_2$, $LiNiO_2$, $LiMnO_2$, $LiMn_2O_4$, $Li(Ni_aCO_bMn_c)O_2$ (0<a<1, 0<b<1, 0<c<1, a+b+c=1), $LiNi_{1-Y}Co_YO_2$, $LiCo_{1-Y}MnYO_2$, $LiNi_{1-Y}MnYO_2$ (wherein 0≤Y<1), $Li(Nia-CobMnc)O_4$ (0<a<2, 0<b<2, 0<c<2, a+b+c=2), $LiMn_{2-z}Ni_zO_4$, $LiMn_{2-z}Co_zO_4$ (wherein 0<Z<2), $Li_xM_yMn_{2-y}O_{4-z}A_z$ (wherein 0.9≤x≤1.2, 0<y<2, 0≤z<0.2, M=at least one of Al, Mg, Ni, Co, Fe, Cr, V, Ti, Cu, B, Ca, Zn, Zr, Nb, Mo, Sr, Sb, W, Ti and Bi, A is one or more anion having a −1 or −2 valence), $Li_{1+a}NibM'_{1-b}O_{2-c}A'_c$ (wherein 0≤a≤0.1, 0≤b≤0.8, and 0≤c<0.2, M' is at least one member selected from the group consisting of stable elements having six-coordination sites, such as Mn, Co, Mg, and Al, and A' is at least one anion having −1 or −2 valence), $LiCoPO_4$, and $LiFePO_4$, and preferably $LiCoO_2$. In addition to these oxides, sulfides, selenides, halides and the like may also be used.

The lithium transition metal oxide is used as a positive electrode active material in the positive electrode mixture 13 together with the binder, the electrically conductive material and the like. The lithium source for forming the lithium metal layer 23 in the negative electrode free battery structure of the present invention is the lithium transition metal oxide. That is, the lithium ions in the lithium transition metal oxide are desorbed to form a lithium metal layer 23 on the negative electrode current collector 21 when performing the charging at a specific range of voltage.

However, in practice, the lithium ions in the lithium transition metal oxides are not easily desorbed by themselves, or lithium ions are not easily desorbed at the operating voltage level, and thus there is no lithium which may be associated with the charging/discharging. Consequently, the formation of the lithium metal layer 23 is very difficult, and even if formed, the function of the lithium transition metal oxide as a lithium positive electrode active material is reduced. As a result, when only lithium transition metal oxide is used, the irreversible capacity is greatly reduced, thereby causing a problem that the capacity and lifetime characteristics of the lithium secondary battery are degraded.

Therefore, in the present invention, a lithium metal compound is used together as an additive capable of providing a lithium source to the lithium transition metal oxide, which is a high-irreversible material exhibiting a difference between the charging capacity and the discharging capacity (non-reversible capacity) of 200 mAh/g or more, and an initial irreversibility of 25% or more, when performing a single charging at 0.01 to 0.2 C in the voltage range of 4.8 V to 2.5 V.

The term 'high-irreversible material' referred to in the present invention can be used in the same sense as the other term 'large-capacity irreversible material', and this means a material having a high ratio of the irreversible capacity of the first cycle of charging/discharging, i.e., "(first cycle charging capacity−first cycle discharging capacity)/first cycle charging capacity". That is, the high-irreversible materials can provide an irreversibly excessive amount of lithium ions during the first cycle of charging/discharging. For example, the high-irreversible material can be a positive electrode material with a large irreversible capacity at the first cycle of charging/discharging (first cycle charging capacity−first cycle discharging capacity) among lithium transition metal compounds that can intercalate and deintercalate lithium ions.

The irreversible capacity of the positive electrode active material commonly used is about 2 to 10% relative to the initial charging capacity. However, in the present invention, the irreversible capacity is preferably 25% or more, or 25% to 50% of the initial charging capacity. The lithium metal compound having an initial charging capacity of 200 mAh/g or more, preferably 230 mAh/g or more may be used. The lithium metal compound serves as a lithium source capable of forming the lithium metal layer 23 while increasing the irreversible capacity of the lithium transition metal oxide which is a positive electrode active material.

Specific examples of the lithium metal compound proposed in the present invention may be any one or more lithium metal compounds selected from the group consisting of $Li_6CoO_4$, $Li_2MnO_3$, $Li_2MoO_3$, $Li_2O$/metal composite, LiF/metal composite, $Li_3N$, $LiN_3$, $Li_2C_2O_4$, $Li_2C_4O_4$, $Li_2C_3O_5$ and $Li_2C_4O_6$.

The lithium metal compounds described above are different in irreversible capacity depending on their structure, and they may be used alone or in combination, and play a role of increasing the irreversible capacity of the positive electrode active material.

For example, the lithium metal compounds are different in irreversible capacity depending on their type, and for example, have numerical values as shown in Table 1 below.

TABLE 1

| | Initial charging capacity (mAh/g) | Initial discharging capacity (mAh/g) | Operation voltage (V, vs $Li^0/Li^+$) |
|---|---|---|---|
| $Li_6CoO_4$ | 700 | 30 | 3-4.3 V |
| $Li_2MnO_3$ | 350 | 260 | 2-4.8 V |
| $Li_2MoO_3$ | 232 | 228 | 1.5-4.4 V |
| $Li_2O$/metal composite (Co, Fe) | 619 | 10 | 2.5-4.1 V, Co |
| | 631 | 19 | 2.5-4.25 V, Fe |
| LiF/metal composite (Co, Fe) | 520 | 4 | 2.5-4.2 V, Co |
| | 532 | 26 | 2.5-4.3 V, Fe |
| $Li_3N$ | 1399 | 10 | 4.2 V, 1-5 um |
| | 670 | 10 | >10 um |
| $LiN_3$ | 500 | 0 | 2.5-4.5 V |

The positive electrode mixture 13 according to the present invention needs to be limited in contents of the positive electrode active material and the lithium metal compound. That is, the parameters affected by the content of the lithium metal compound are the thickness of the lithium metal layer 23 and the loading amount in the positive electrode active material, which are in a trade-off relationship with each other.

Typically, the thicker the lithium metal layer 23 is, the better the lifetime characteristics is. Accordingly, if the content of the lithium metal compound, which is a lithium source, is large, the thickness of the lithium metal layer 23 formed on the negative electrode current collector 21 may be increased, it is possible to secure the advantage that the thickness of the lithium metal layer 23 formed on the negative electrode current collector 21 is increased, but there is a problem that the loading amount of the positive electrode active material loaded in the entire positive electrode mixture is reduced. The loading amount of the positive electrode active material thus reduced causes a decrease in overall battery capacity. On the contrary, if the content of the lithium metal compound is small, there are disadvantages that the loading amount of the positive electrode active material is high but irreversibility cannot be compensated enough, but it is possible to form the lithium metal layer 23 having a thickness thinner than a commercially available lithium foil, thereby reducing the thickness and weight of the battery.

For this reason, the positive electrode mixture 13 proposed in the present invention contains the positive electrode active material and the lithium metal compound in the range of weight ratio of the positive electrode active material:the lithium metal compound of 5:95 to 95:5, preferably 1:9 to 9:1, more preferably 3:7 to 7:3, and preferably, the lithium metal compound is used within 70% relative to the total weight of the positive electrode mixture. Specifically, it is preferable to use the positive electrode active material and lithium metal compound in the range of weight ratio of the positive electrode active material:lithium metal compound of 9:1 to 3:7. Through this content range, the positive electrode mixture of the present invention has a loading amount of 1 to 10 mAh/cm², preferably a loading amount of 2 to 10 mAh/cm², more preferably a loading amount of 3 to 10 mAh/cm². In addition, as the lithium secondary battery of the present invention comprises the positive electrode mixture as described above, a secondary battery comprising the negative electrode on which lithium is formed after the first charging may be configured.

The lithium metal compounds are characterized by achieving a capacity recovery of 90% or more after the over-discharging test without reducing the capacity of the battery at the same time, by adjusting the irreversible capacity of the positive electrode. The lithium metal compound is a material capable of deintercalating 1 mole or more of lithium ions during the first cycle charging and capable of intercalating and deintercalating 1 mole or less of lithium ions in the cycles after the first cycle discharging. Therefore, if the lithium metal compound is added to the positive electrode, excess lithium (Li) as much as the desired capacity in the first cycle can be formed by forming Li on the negative electrode as much as the irreversible capacity of the positive electrode.

The positive electrode active material according to the present invention comprises the lithium transition metal oxide and the lithium metal compound as described above, and at this time, the form thereof is not particularly limited as long as lithium can be irreversibly released from the lithium metal sulfur compound.

For example, the positive electrode active material and the lithium metal compound may be dispersed into the positive electrode mixture 13 in a mixed state with each other or may be also formed in a core-shell structure. In the core-shell structure, the core may be the positive electrode active material or the lithium metal compound, and the shell may be the lithium metal or the positive electrode active material. Also, if desired, the form of their mixture can form the core and shell, respectively. In addition, the shell can be formed as a single layer or multiple layers. Preferably, when the shell is formed of the lithium metal compound, lithium ions can easily be desorbed from the lithium metal compound by charging the battery.

In one embodiment, the lithium metal compound may be coated on the current collector in admixture with the positive electrode active material.

In another embodiment, the first coating layer comprising the positive electrode active material is coated on the current collector and the coating layer comprising the lithium metal compound may be applied on the first coating layer.

Specifically, since the first coating layer is composed of the positive electrode active material, the electrically conductive material and the binder and the second coating layer is composed of the lithium metal compound, the electrically conductive material and the binder, the lithium metal compound of the second coating layer is transformed into an irreversible state during the activation of the secondary battery and then can act as a protective layer for the first coating layer.

That is, the second coating layer is in the form of a metal sulfide compound, from which lithium is removed from the lithium metal compound, and is thermally and electrochemically stable, and thus can suppress the side reaction of the electrode and the electrolyte solution, thereby protecting the first coating layer.

The positive electrode active material of these simple mixing and core-shell structures is used according to the above-mentioned content.

In addition, the positive electrode active material according to the present invention may additionally comprise a known material capable of enhancing the irreversible capacity, for example, a material such as $Li_xVO_3(1 \leq x \leq 6)$, $Li_3Fe_2(PO_4)_3$, $Li_3Fe_2(SO_4)_3$, or $Li_3V(PO_4)_3$ or a material such as $MnO_2$, $MoO_3$, $VO_2$, $V_2O_5$, $V_6O_{13}$, $Cr_3O_8$, $CrO_2$, $Al_2O_3$, $ZrO_2$, $AlPO_4$, $SiO_2$, $TiO_2$, or $MgO$.

These materials are used in an amount of not more than 60 parts by weight, not more than 50 parts by weight, preferably not more than 40 parts by weight, relative to 100 parts by weight of the positive electrode active material.

Also, in the present invention, the charging for forming the lithium metal layer 23 is performed once at 0.01 to 0.2 C in the voltage range of 4.5V to 2.5V. If the charging is performed below the above range, the formation of the lithium metal layer 23 becomes difficult. On the contrary, if the charging is performed above the range, over-discharging due to damage of the cell occurs and then the charging/discharging does not proceed properly.

The lithium metal layer 23 formed above forms a uniform continuous or discontinuous layer on the negative electrode current collector 21. For example, if the negative electrode current collector 21 is in the form of a foil, it can have a form of the continuous thin film, and if the negative electrode current collector 21 has a three-dimensional porous structure, the lithium metal layer 23 may be discontinuously formed. That is, a discontinuous layer means that the region where the lithium metal layer 23 exists is distributed without continuity, because the region where the lithium metal layer 23 exists and the region where the lithium metal layer 23 does not exist are present in a discontinuous distribution in the specific region and also the region where the lithium metal layer 23 exists is distributed so as to interrupt, isolate or separate, like an island type, the region where the lithium compound exists by the region where the lithium metal layer 23 does not exist.

The lithium metal layer 23 formed through such charging/discharging has a thickness of 50 nm or more and 100 μm or less, preferably 1 μm to 50 μm, for the function as a negative electrode. If the thickness is less than the above range, the charging/discharging cycle lifetime of the battery is drastically reduced. On the contrary, if the thickness exceeds the above range, lifetime characteristics and the like are stable, but there is a problem that the energy density of the battery is lowered.

Particularly, in the case of the lithium metal layer 23 proposed by the present invention, the battery is manufactured as a negative electrode-free battery without lithium metal at the time of assembling. Accordingly, an oxide layer, which is generated during the assembly process due to the high reactivity lithium, is not formed or hardly formed on the lithium metal layer 23, in comparison with the lithium secondary battery assembled using conventional lithium foil. Thus, a degradation phenomenon of the lifetime of the battery due to the oxidation layer can be prevented.

Also, the lithium metal layer 23 is moved by charging the high-irreversible material, and it can form a more stable lithium metal layer 23 in comparison with the lithium metal layer 23 formed on the positive electrode. When the lithium metal is attached on the positive electrode, a chemical reaction between the positive electrode and the lithium metal may occur.

The positive electrode mixture 13 comprising the positive electrode active material and the lithium metal compound is constituted, and at this time, the positive electrode mixture 13 may further comprise electrically conductive materials, binders, and other additives commonly used in lithium secondary batteries.

The electrically conductive material is used to further improve the electrical conductivity of the electrode active material. The electrically conductive material is not particularly limited as long as it is electrically conductive without causing chemical changes in the relevant battery. Examples of the electrically conductive material may comprise graphite such as natural graphite and artificial graphite; carbon blacks such as carbon black, acetylene black, Ketjen black, channel black, furnace black, lamp black, and thermal black; electrically conductive fibers such as carbon fibers or metal fibers; metal powders such as carbon fluoride powder, aluminum powder, and nickel powder; electrically conductive whiskers such as zinc oxide and potassium titanate; electrically conductive metal oxides such as titanium oxide; polyphenylene derivatives and the like.

A binder may further be included for the binding of the positive electrode active material, the lithium metal compound and the conductive material and for the binding to the current collector. The binder may comprise thermoplastic resins or thermosetting resins. As the binder, for example, polyethylene, polypropylene, polytetrafluoro ethylene (PTFE), polyvinylidene fluoride (PVDF), styrene-butadiene rubber (SBR), tetrafluoroethylene-perfluoro alkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoro propylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoro ethylene copolymer and ethylene-acrylic copolymer, etc. can be used alone or in combination, but it is not necessarily limited to these and any one that can be used as a binder in the art can be used.

Examples of other additives comprise fillers. The filler is optionally used as a component for suppressing the expansion of the electrode and is not particularly limited as long as it is a fibrous material without causing a chemical change in the relevant battery. For example, fibrous materials such as an olefinic polymer such as polyethylene or polypropylene, or glass fiber or carbon fiber, etc. are used.

A positive electrode mixture 13 of the present invention is formed on a positive electrode current collector 11.

The positive electrode current collector generally is made in a thickness of 3 μm to 500 μm. The positive electrode current collector 11 is not particularly limited as long as it has high electrical conductivity without causing chemical changes in the battery. For example, stainless steel, aluminum, nickel, titanium, sintered carbon, or aluminum or stainless steel surface-treated with carbon, nickel, titanium, silver or the like may be used as the positive electrode current collector. In this case, the positive electrode current collector 11 may be formed in various forms such as film, sheet, foil, net, porous body, foam, or nonwoven fabric having fine irregularities formed on its surface in order to enhance the bonding force with the positive electrode active material.

The method of coating the positive electrode mixture 13 on the current collector may comprise a method of dispensing the electrode mixture slurry on the current collector and then uniformly dispersing the electrode mixture slurry using a doctor blade or the like, and methods such as die casting, comma coating, and screen printing. In addition, the slurry of the electrode mixture may be formed on a separate substrate, and then the slurry of the electrode mixture may be bonded to the current collector by a pressing or lamination method but is not limited thereto.

Also, in the negative electrode-free battery structure of the present invention, the negative electrode current collector 21 constituting the negative electrode generally can be made in a thickness of 3 μm to 500 μm.

In addition, the negative electrode current collector 21 is not particularly limited as long as it has electrical conductivity without causing a chemical change in the lithium secondary battery. For example, copper, stainless steel, aluminum, nickel, titanium, sintered carbon, copper or stainless steel surface-treated with carbon, nickel, titanium, silver or the like; aluminum-cadmium alloy or the like may be used as the negative electrode current collector.

The negative electrode current collector 21, in which the lithium metal layer 23 can be formed by charging, is not particularly limited as long as it has electrical conductivity without causing a chemical change in the lithium secondary battery. For example, copper, stainless steel, aluminum, nickel, titanium, sintered carbon, copper or stainless steel surface-treated with carbon, nickel, titanium, silver or the like; aluminum-cadmium alloy or the like may be used as the negative electrode current collector.

Also, as with the positive electrode current collector 11, the shape of the negative electrode current collector 21 can be various forms such as a film having fine irregularities on its surface, sheet, foil, net, porous body, foam, nonwoven fabric and the like.

Figure 4:
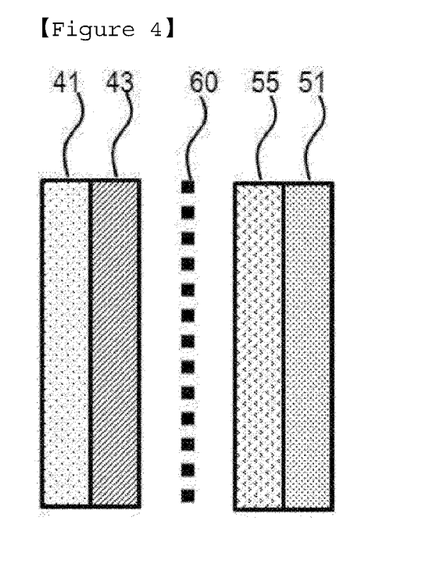
FIG. 4 is a schematic diagram of the lithium secondary battery manufactured according to the second embodiment of the present invention.
Figure 5:
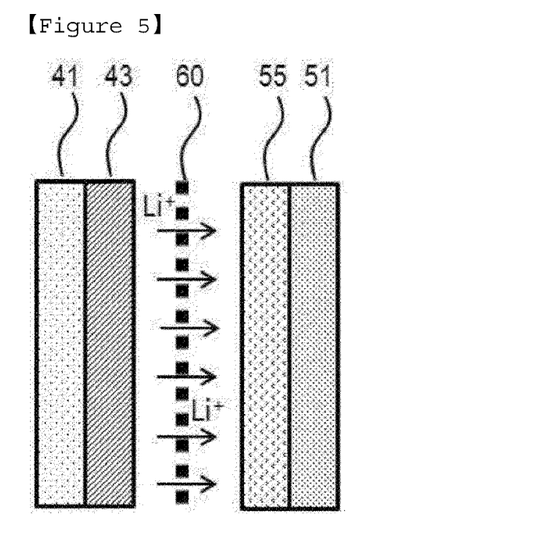
FIG. 5 is a schematic diagram showing the movement of lithium ion (Li$^+$) during the initial charging of the lithium secondary battery manufactured according to the second embodiment of the present invention.

Meanwhile, in the lithium secondary battery according to the second embodiment of the present invention, a protective layer 55 may be additionally formed on the surface of the negative electrode in contact with the separator 60. Specifically, the protective layer 55 may be formed on a surface of the negative electrode on a negative electrode current collector 51 in contact with the separator 60.

Thus, when forming the protective layer 55, the lithium metal layer 23 is formed on the negative electrode current collector 51 by the lithium ions that are transferred from the positive electrode mixture 43 and passed through the protective layer 55, as shown in FIG. 4.

Accordingly, the protective layer 55 may be any material capable of smoothly transferring lithium ions therethrough, the lithium ion conductive polymer and/or any material used for the inorganic solid electrolyte may be used as the protective layer, and the protective layer may further comprise a lithium salt if necessary.

The lithium ion conductive polymer may comprise, for example, but is not limited to, any one selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, Li$_3$N, Li$_x$La$_{1-x}$TiO$_3$(0<x<1) and Li$_2$S—GeS—Ga$_2$S$_3$ or a mixture of two or more thereof. The lithium ion conductive polymer can be used without restriction if it has conductivity for lithium ion.

The formation of the protective layer 55 using a lithium ion conductive polymer is performed by dissolving or swelling the lithium ion conductive polymer in a solvent to prepare a coating solution and then coating it to the negative electrode current collector 51.

The method of coating the negative electrode current collector 51 may be selected from known methods in consideration of the characteristics of the material or may be performed by any new appropriate method. For example, it is preferable that the polymer protective layer composition is distributed onto the current collector, and then uniformly dispersed using a doctor blade or the like. In some cases, a method of executing the distribution and dispersion processes in one process may be used. In addition, the protective layer may be formed by methods such as dip coating, gravure coating, slit die coating, spin coating, comma coating, bar coating, reverse roll coating, screen coating, cap coating, etc. At this time, the negative electrode current collector 51 is the same as described above.

Thereafter, a drying process may be performed on the protective layer 55 formed on the negative electrode current collector 51, and at this time, the drying process may be performed by a method such as heating or hot air drying, etc. at a temperature of 80 to 120° C. depending on the type of the solvent used in the lithium ion conductive polymer.

In this case, the solvent is preferably a solvent having a similar solubility index to the lithium ion conductive polymer and a low boiling point. This is because the mixing can be made uniform and then the solvent can be easily removed. Specifically, the solvent may be N,N-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or a mixture thereof.

When the lithium ion conductive polymer is used, in order to further increase lithium ion conductivity, a substance used for this purpose is further included.

For example, lithium salts such as LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, lithium chloroborane, lithium lower aliphatic carboxylate, lithium tetraphenyl borate, lithium imide and the like may be further included.

The inorganic solid electrolyte may be a ceramic material, which is a crystalline material or an amorphous material, and may be inorganic solid electrolytes such as thio-LISICON (Li$_{3.25}$Ge$_{0.25}$P$_{0.75}$S$_4$), Li$_2$S—SiS$_2$, LiI—Li$_2$S—SiS$_2$, LiI—Li$_2$S—P$_2$S$_5$, LiI—Li$_2$S—P$_2$O$_5$, LiI—Li$_3$PO$_4$—P$_2$S$_5$, Li$_2$S—P$_2$S$_5$, Li$_3$PS$_4$, Li$_7$P$_3$S$_{11}$, Li$_2$O—B$_2$O$_3$, Li$_2$O—B$_2$O$_3$—P$_2$O$_5$, Li$_2$O—V$_2$O$_5$—SiO$_2$, Li$_2$O—B$_2$O$_3$, Li$_3$PO$_4$, Li$_2$O—Li$_2$WO$_4$—B$_2$O$_3$, LiPON, LiBON, Li$_2$O—SiO$_2$, LiI, Li$_3$N, Li$_5$La$_3$Ta$_2$O12, Li$_7$La$_3$Zr$_2$O$_{12}$, Li$_6$BaLa$_2$Ta$_2$O$_{12}$, Li$_3$PO$_{(4-3/2w)}$Nw (w is w<1), Li$_{3.6}$Si$_{0.6}$P$_{0.4}$O$_4$ and the like. At this time, when using the inorganic solid electrolyte, if necessary, lithium salt may be further comprised.

The inorganic solid electrolyte may be mixed with known materials such as a binder and applied in a thick film form through slurry coating. Further, if necessary, it is possible to apply in the form of a thin film through a deposition process such as sputtering. The slurry coating method used can be appropriately selected based on the coating method, the drying method and the solvent as mentioned in connection with the lithium ion conductive polymer.

The protective layer 55 comprising the lithium ion conductive polymer and/or the inorganic solid electrolyte described above can simultaneously ensure the effect of inhibiting or preventing the formation of the lithium dendrite, which is generated when the lithium metal layer 23/the negative electrode current collector 51 are used as the negative electrode, while increasing the transfer rate of lithium ions and then facilitating the formation of the lithium metal layer 23.

In order to ensure the above effect, it is necessary to limit the thickness of the protective layer 55.

The lower the thickness of the protective layer 55, the better the output characteristics of the battery. However, only when the protective layer is formed over a certain thickness, the side reaction between the lithium and the electrolyte formed on the negative electrode current collector 51 can be suppressed subsequently and further the growth of the dendrite can be effectively blocked. In the present invention, the thickness of the protective layer 55 may be preferably 10 nm to 50 µm, more preferably 100 nm to 50 µm, and most preferably 1 µm to 50 µm. If the thickness of the protective layer 55 is less than the above range, the over-charging or the side reaction and the exothermic reaction between the lithium and the electrolyte which are increased under the conditions such as high temperature storage cannot be effectively suppressed and thus the safety cannot be improved. Also, if the thickness exceeds the above range, the composition of the protective layer 55 in the case of the lithium ion conductive polymer is required to be impregnated or swelled for a long time by the electrolytic solution and there is a concern that the movement of the lithium ions is lowered and the performance of the whole battery is deteriorated.

For the lithium secondary battery of the second embodiment of the present invention, the rests of the configuration except for the protective layer 55 are the same as those mentioned in the first embodiment.

Figure 6:
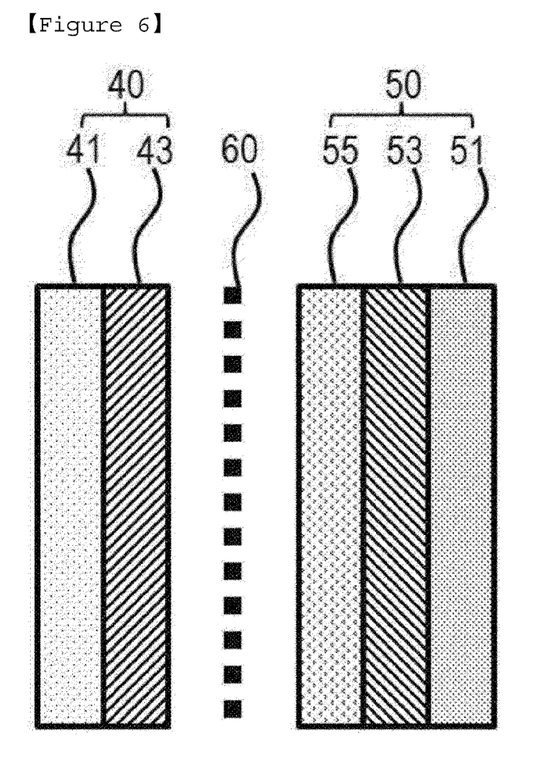
FIG. 6 is a schematic diagram after completion of the initial charging of the lithium secondary battery manufactured according to the first embodiment of the present invention.

Meanwhile, as shown in the structures of FIGS. 3 and 6, the lithium secondary battery may comprise the positive electrode 40, the negative electrode 50 and the separators 30 and 60 interposed therebetween and the electrolyte (not shown), and the separators 30 and 60 may be excluded depending on the type of the battery.

In this case, the separators 30 and 60 may be made of a porous substrate. The porous substrate may be any porous substrate commonly used in an electrochemical device. For example, a polyolefin-based porous film or a nonwoven fabric may be used, but is not particularly limited thereto.

The separator 30 and 60 according to the present invention is not particularly limited in its material and any separator can be used without any particular limitation as long as it is a separator commonly used as the separator 30 and 60 in the lithium secondary battery, while physically separating the positive electrode and the negative electrode from each other and having a permeability to electrolyte and ions. However, materials that are porous, nonconductive, or insulative, especially those that have low resistance to migration of ions in the electrolyte solution and have good wetting ability to the electrolyte solution are desirable. For example, a polyolefin-based porous membrane or nonwoven fabric may be used, but it is not particularly limited thereto.

Examples of the polyolefin-based porous film may be films formed of any polymer alone selected from polyethylenes such as high density polyethylene, linear low-density polyethylene, low density polyethylene, and ultra-high molecular weight polyethylene, and polyolefin-based polymers such as polypropylene, polybutylene, and polypentene, or formed of a polymer mixture thereof.

In addition to the above-mentioned polyolefin-based nonwoven fabric, the nonwoven fabric may be a nonwoven fabric formed of, for example, any polymer alone selected from polyphenylene oxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester, and the like, or formed of a polymer mixture thereof. Such nonwoven fabrics comprise a nonwoven fabric in the form of a fiber to form a porous web, that is, a spun-bond or a melt-blown nonwoven fabric composed of long fibers.

The thickness of the separator 30 and 60 is not particularly limited, but is preferably in the range of 1 to 100 µm, more preferably 5 to 50 µm. If the thickness of the separator 30 and 60 is less than 1 µm, the mechanical properties cannot be maintained. If the thickness of the separator exceeds 100 µm, the separator 30 and 60 acts as a resistive layer, thereby deteriorating the performance of the battery.

The pore size and porosity of the separator 30 and 60 are not particularly limited, but it is preferable that the pore size is 0.1 to 50 µm and the porosity is 10 to 95%. If the separator 30 and 60 has a pore size of less than 0.1 µm or a porosity of less than 10%, the separator 30 and 60 acts as a resistive layer. If the separator has a pore size of more than 50 µm or a porosity of more than 95%, mechanical properties cannot be maintained.

The electrolyte of the lithium-sulfur battery is a lithium salt-containing electrolyte solution, which may be an non-aqueous electrolyte consisting of a non-aqueous organic solvent electrolyte solution and lithium salt. In addition, organic solid electrolytes, inorganic solid electrolytes, and the like may be included, but are not limited thereto.

The non-aqueous organic solvent may be, for example, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetraethyleneglycol dimethylether, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate The electrolyte salt contained in the non-aqueous electrolyte solution is a lithium salt. As the lithium salt, lithium salts conventionally used in the electrolyte solution for the lithium secondary battery may be used without limitation. The anions of the lithium salts include, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ or a combination of two or more thereof.

As the organic solvent contained in the non-aqueous electrolyte solution, the organic solvents commonly used in the electrolyte for the lithium secondary battery may be used without limitation, and for example, ethers, esters, amides, linear carbonates, cyclic carbonates, etc. may be used alone or in combination of two or more thereof. Among them, carbonate compounds which are representatively cyclic carbonates, linear carbonates, or a mixture thereof may be included.

Specific examples of the cyclic carbonate compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides include, but are not limited to, fluoroethylene carbonate (FEC) and the like.

In addition, specific examples of the linear carbonate compound may be, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof.

In particular, ethylene carbonate and propylene carbonate, which are cyclic carbonates among the carbonate-based organic solvent, are highly viscous organic solvents having a high dielectric constant, so that the lithium salt in the electrolyte can be more easily dissociated. If such cyclic carbonates are mixed with linear carbonates having a low viscosity and a low dielectric constant, such as dimethyl carbonate and diethyl carbonate, in an appropriate ratio, an electrolyte solution having a higher electrical conductivity can be produced.

In addition, the ether among the organic solvents may be, but is not limited to, at least one selected from the group consisting of dimethyl ether, diethyl ether, dipropyl ether, methylethyl ether, methylpropyl ether, and ethylpropyl ether, or a mixture of two or more thereof.

In addition, the ester among the organic solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof.

The injection of the non-aqueous electrolyte solution can be performed at an appropriate stage of the manufacturing process of the electrochemical device depending on the manufacturing process and required properties of the final product. That is, it can be applied before assembling the electrochemical device or in the final stage of assembling the electrochemical device.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ may be used.

In addition, to the non-aqueous electrolyte, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may be added for the purpose of improving charging/discharging characteristics, flame retardancy and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium secondary battery is manufactured by injecting an electrolyte solution into the upper part of the case and sealing it with a cap plate and a gasket.

At this time, the lithium secondary battery can be classified into various batteries such as a lithium-sulfur battery, a lithium-air battery, a lithium-oxide battery, and a lithium all-solid battery depending on the material of the positive electrode and the separator, and classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention can be used as a power source for devices requiring high capacity and high rate characteristics, etc. Specific examples of the device may comprise, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Hereinafter, preferred examples are presented to facilitate understanding of the present invention. However, it is apparent to those skilled in the art that the following examples are merely illustrative of the present invention and that various changes and modifications can be made within the scope and spirit of the present invention, and also that such changes and modifications fall within the scope of the appended claims.

EXAMPLES AND COMPARATIVE EXAMPLES

Example 1: Preparation of Negative Electrode Free Battery

To 30 ml of N-methyl-2-pyrrolidone, 35 g of LCO (LiCoO$_2$) and 15 g of Li$_2$O/Co composite (Li$_2$O:Co content in a weight ratio of 3:1) are added and mixed, and the product was defined as a mixed composition of positive electrode active material. the mixed composition of positive electrode active material, Super-P and the binder (PVdF) was mixed in a weight ratio of the mixed composition of positive electrode active material:Super-P:the binder (PVdF) of 95:2.5:2.5 and then mixed for 30 minutes with a paste face mixer to prepare a slurry composition.

Subsequently, the slurry composition prepared above was coated on a current collector (Al Foil, thickness 20 μm) and dried at 130° C. for 12 hours to prepare a positive electrode having a loading amount of 2 mAh/cm$^2$.

Thereafter, after preparing a copper current collector as the negative electrode current collector 21, An electrode assembly was manufactured by interposing a porous polyethylene separator between the positive electrode prepared above and the negative electrode current collector 21, and the electrode assembly was placed inside the case and then the electrolyte was injected to manufacture a lithium secondary battery. In this case, the electrolyte was prepared by dissolving 1 M LiPF$_6$ and 2 wt. % of VC (Vinylene Carbonate) in an organic solvent consisting of EC (ethylene carbonate), DEC (diethyl carbonate) and DMC (dimethyl carbonate) at a volume ratio of 1:2:1 of EC:DEC:DMC.

Example 2: Preparation of Negative Electrode Free Battery

A negative electrode free battery was manufactured in the same manner as in Example 1, except that LiF/Co composite (LiF:Co content is weight ratio of 6:1) instead of Li$_2$O/Co composite is used.

Example 3: Preparation of Negative Electrode Free Battery

A negative electrode free battery was manufactured in the same manner as in Example 1, except that Li$_3$N instead of Li$_2$O/Co composite is used.

Example 4: Preparation of Negative Electrode Free Battery

A negative electrode free battery was manufactured by further forming a LiPON protective layer on the negative electrode battery manufactured in Example 3.

Specifically, in the case of the LiPON protective layer, the coating layer was formed by spattering for 25 minutes using a Li$_3$PO$_4$ target in a vacuum chamber of N$_2$ atmosphere. It was confirmed that the thickness of the surface coating layer was adjusted depending on the deposition time, and a protective layer (thickness: 0.2 μm) was formed on the copper current collector. The thickness of the coating layer formed on the surface of the coating layer was confirmed using a scanning electron microscope.

Comparative Example 1: Preparation of Negative Electrode Free Battery

A negative electrode free battery was prepared in the same manner as in Example 1, except that Li$_2$O/Co composite is not added.

Experimental Example 1: Evaluation of the Performance of the Lithium Secondary Battery The negative electrode-free lithium secondary batteries prepared in Examples and Comparative Examples were charged once at 0.1 C and 4.25V CC/CV (5% current cut at 1 C) to prepare lithium secondary batteries in which lithium metal was formed.

The thickness of the formation of the negative electrode and the number of cycles at which the capacity retention ratio reached 80% relative to the initial discharging capacity were measured by charging/discharging the lithium secondary battery using a charging/discharging measuring device (PNE SOLUTION company) under conditions of charging 0.2 C and discharging 0.5 C. The results obtained are shown in Table 2 below.

TABLE 2

| | Positive electrode additive | Thickness of formation of negative electrode | Protective layer | Number of cycles at which capacity retention ratio reached 80% relative to initial discharging capacity |
|---|---|---|---|---|
| Example 1 | Li$_2$O/Co Composite | 9.0 μm | X | 48 cycles |
| Example 2 | LiF/Co Composite | 9.2 μm | X | 44 cycles |
| Example 3 | Li$_3$N | 8.4 μm | X | 50 cycles |
| Example 4 | Li$_3$N | 8.0 μm | LIPON | 89 cycles |
| Comparative Example 1 | X | 10.0 μm | X | 11 cycles |

Referring to Table 2, it can be seen that the capacity and lifetime characteristics of negative electrode-free lithium secondary batteries according to Examples are superior to Comparative Example 1.

Specifically, as shown in Table 2, it can be seen that in the case of Example 1 comprising $Li_2O/Co$ composite as an additive for the positive electrode, Example 2 comprising LiF/Co composite as an additive for the positive electrode, and Examples 3 and 4 comprising $Li_3N$ composite as an additive for the positive electrode, the decrease in capacity is slowly progressed, thereby improving the capacity retention and enhancing the lifetime characteristics, as compared to Comparative Example 1 which does not use the additive for the positive electrode. In addition, it can be seen that in the case of Example 4 comprising a protective layer, the capacity retention performance is further remarkably improved.

From these results, it can be seen that in the case of the negative electrode-free lithium secondary battery comprising the additive for the positive electrode according to the present invention, not only the initial capacity is improved but also the capacity retention rate is excellent, thereby improving the lifetime characteristics.

DESCRIPTION OF SYMBOLS

10, 40: Positive electrode
11, 41: Positive electrode current collector
13, 43: Positive electrode mixture
20, 50: Negative electrode
21, 51: Negative electrode current collector
23, 53: Negative electrode mixture
30, 60: Separator
55: Protective layer

The invention claimed is:

1. A lithium secondary battery comprising a positive electrode, a negative electrode, a separator interposed therebetween and an electrolyte,
   wherein the positive electrode includes:
      a positive electrode current collector; and
      a positive electrode mixture comprising a positive electrode active material and a lithium metal compound,
   the negative electrode includes only a negative electrode current collector before charging,
   the negative electrode current collector consists essentially of a metal selected from the group consisting of copper, stainless steel, aluminum, nickel, titanium, silver, and aluminum-cadmium alloy,
   the lithium metal compound has an irreversible capacity of 200 mAh/g or more, and
   during charging of the lithium secondary battery, lithium metal of the lithium metal compound included in the positive electrode mixture is released from the positive electrode and is directly deposited on the negative electrode current collector.

2. The lithium secondary battery according to claim 1, wherein the lithium metal compound comprises one or more selected from the group consisting of $Li_6CoO_4$, $Li_2MnO_3$, $Li_2MoO_3$, a composite including $Li_2O$ and a metal, a composite including LiF and a metal, $Li_3N$ and $LiN_3$.

3. The lithium secondary battery according to claim 1, wherein the lithium metal disposed on the negative electrode current collector is formed through one time charging in a voltage range of 4.8 V to 2.5 V.

4. The lithium secondary battery according to claim 1, wherein a protective layer is formed on the negative electrode current collector on a side facing the separator.

5. The lithium secondary battery according to claim 1, wherein the positive electrode mixture comprises the positive electrode active material and the lithium metal compound in a weight ratio of the positive electrode active material:the lithium metal compound of 5:95 to 95:5.

6. The lithium secondary battery according to claim 5, wherein the positive electrode active material is present as a mixture with the lithium metal compound or forms a core-shell structure with the lithium metal compound.

7. The lithium secondary battery according to claim 5, wherein the positive electrode active material comprises at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}MnYO_2$, $LiNi_{1-y}MnYO_2$ (wherein $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $Li_xM_yMn_{2-y}O_{4-z}A_z$ (wherein $0.9 \leq x \leq 1.2$, $0<y<2$, $0 \leq z<0.2$, M is at least one of Al, Mg, Ni, Co, Fe, Cr, V, Ti, Cu, B, Ca, Zn, Zr, Nb, Mo, Sr, Sb, W, Ti or Bi, and A is one or more anion having a $-1$ or $-2$ valence), $Li_{1+a}Ni_bM'_{1-b}O_{2-c}A'_c$ (wherein $0 \leq a \leq 0.1$, $0 \leq b \leq 0.8$, and $0 \leq c<0.2$, M' is at least one member selected from the group consisting of stable elements having six-coordination sites of Mn, Co and Mg, and Al, and A' is at least one anion having $-1$ or $-2$ valence), $LiCoPO_4$, and $LiFePO_4$.

8. The lithium secondary battery according to claim 1, wherein the positive electrode mixture comprises at least one selected from the group consisting of $Li_xVO_3$ ($1 \leq x \leq 6$), $Li_3Fe_2(PO_4)_3$, $Li_3Fe_2(SO_4)_3$, $Li_3V(PO_4)_3$, $MnO_2$, $MoO_3$, $VO_2$, $V_2O_5$, $V_6O_{13}$, $Cr_3O_8$, $CrO_2$, $Al_2O_3$, $ZrO_2$, $AlPO_4$, $SiO_2$, $TiO_2$, and MgO.

9. The lithium secondary battery according to claim 1, wherein the positive electrode mixture has a loading amount of 1 to 10 mAh/cm².

10. The lithium secondary battery according to claim 4, wherein the protective layer comprises at least one of a lithium ion conductive polymer or an inorganic solid electrolyte.

11. The lithium secondary battery according to claim 10, wherein the lithium ion conductive polymer comprises polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP).

12. The lithium secondary battery according to claim 10, wherein the inorganic solid electrolyte comprises at least one selected from the group consisting of thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w is w<1), and $Li_{3.6}Si_{0.6}P_{0.4}O_4$.

13. The lithium secondary battery according to claim 10, wherein the protective layer further comprises at least one lithium salt selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$ lithium chloroborane, lithium lower aliphatic carboxylate, lithium tetraphenyl borate, and lithium imide.

14. The lithium secondary battery according to claim 10, wherein the protective layer has a thickness of 10 nm to 50 µm.

15. The lithium secondary battery according to claim 2, wherein the composite including $Li_2O$ and a metal is a composite including $Li_2O$ and Co.

16. The lithium secondary battery according to claim 15, wherein the composite including $Li_2O$ and Co comprises $Li_2O$ and Co in a weight ratio of 3:1.

17. The lithium secondary battery according to claim 2, wherein the composite including LiF and a metal is a composite including LiF and Co.

18. The lithium secondary battery according to claim 17, wherein the composite including LiF and Co comprises LiF and Co in a weight ratio of 6:1.

19. A lithium secondary battery comprising a positive electrode, a negative electrode, a separator interposed therebetween and an electrolyte,
- wherein the positive electrode includes:
  - a positive electrode current collector; and
  - a positive electrode mixture comprising a positive electrode active material and a lithium metal compound,
- the negative electrode includes only a negative electrode current collector before charging,
- the negative electrode current collector consists essentially of copper, stainless steel, aluminum, nickel, or titanium,
- during charging of the lithium secondary battery, lithium metal of the lithium metal compound included in the positive electrode mixture is released from the positive electrode and is directly deposited on the negative electrode current collector.

20. The lithium secondary battery according to claim 10, wherein the inorganic solid electrolyte comprises LiPON, $Li_3N$, $Li_xLa_{1-x}TiO_3$ ($0<x<1$) or $Li_2S$—$GeS$—$Ga_2S_3$.

* * * * *